United States Patent
Yaniv et al.

(10) Patent No.: US 11,350,295 B2
(45) Date of Patent: May 31, 2022

(54) GENERATION NODE AND DATA STORE

(71) Applicant: RADCOM LTD., Tel Aviv (IL)

(72) Inventors: Tal Yaniv, Kfar Saba (IL); Eyal David Harari, Tenafly, NJ (US); Yehiel Itman, Givatayim (IL); Ram Amit, Raanana (IL); Tomer Tuvia Ilan, Herzliya (IL)

(73) Assignee: RADCOM LTD., Tel Aviv (IL)

(*) Notice: Subject to any disclaimer, the term of this patent is extended or adjusted under 35 U.S.C. 154(b) by 121 days.

(21) Appl. No.: 16/824,964

(22) Filed: Mar. 20, 2020

(65) Prior Publication Data

US 2020/0305011 A1 Sep. 24, 2020

Related U.S. Application Data

(60) Provisional application No. 62/821,460, filed on Mar. 21, 2019.

(51) Int. Cl.
| | |
|---|---|
| *G06F 7/00* | (2006.01) |
| *G06F 17/00* | (2019.01) |
| *H04W 24/08* | (2009.01) |
| *G06F 16/245* | (2019.01) |
| *G06F 16/23* | (2019.01) |
| *G06F 16/22* | (2019.01) |

(52) U.S. Cl.
CPC ........ *H04W 24/08* (2013.01); *G06F 16/2237* (2019.01); *G06F 16/2365* (2019.01); *G06F 16/245* (2019.01)

(58) Field of Classification Search
CPC ..... H04W 24/08; H04W 88/18; G06F 16/245; G06F 16/2365; G06F 16/2237
USPC .......................................................... 707/689
See application file for complete search history.

(56) References Cited

U.S. PATENT DOCUMENTS

| | | | |
|---|---|---|---|
| 10,776,441 B1* | 9/2020 | Echeverria | H04L 67/2809 |
| 10,929,415 B1* | 2/2021 | Shcherbakov | G06F 16/26 |
| 11,086,869 B1* | 8/2021 | Aleti | G06F 16/2425 |
| 11,106,734 B1* | 8/2021 | Batsakis | G06F 3/0656 |
| 2018/0300806 A1* | 10/2018 | Wittkotter | G06F 16/2456 |

* cited by examiner

*Primary Examiner* — Tuan A Pham
(74) *Attorney, Agent, or Firm* — A.C. Entis-IP Ltd.; Allan C. Entis (57) ABSTRACT

A data store configured to store data generated by activity of network elements (NEs) of a communications network, the data store comprising: a stateless Base-index data store configured to store stateless Base-index records, each stateless Base-index record comprising a copy of at least a portion of data comprised in a protocol data unit (PDU) generated by an NE and a stateless Base-index vector comprising a value for at least one intrinsic Base-index from a selection of intrinsic Base indices, which value may be used to associate the PDU with a temporary feature of the network; and a stateful identifier index (ID-index) store configured to store stateful ID-index records, each stateful ID-index stateful record comprising an identifier index (ID-index) vector.

19 Claims, 10 Drawing Sheets

GENERATION NODE AND DATA STORE

RELATED APPLICATIONS

The present application claims benefit under 35 U.S.C. 119(e) of U.S. Provisional Application 62/821,460 filed Mar. 21, 2019, the disclosure of which is incorporated herein by reference.

FIELD

Embodiments of the invention relate to monitoring a communication network.

BACKGROUND

Modern communication networks support large, varied, and growing populations of users and an ever increasing gamut of user services and user applications for users who access the networks using any of various stationary and/or mobile user equipment (UE). The networks span not only global populations and geography, but a plethora of methods, devices, infrastructures, and protocols for propagating data, voice, and video content provided by a host of different large and small service providers.

As the various software and hardware resources that support the networks, configure paths along which network transmissions and packets propagate in the networks, and provide services mediated by the networks have become more sophisticated, the resources have become fungible and logically abstracted away from their particular physical structures. The physical devices and apparatus underlying modern communication networks have become commodity resources that are configurable by software to provide network functions. Dedicated physical devices that provide particular network functions have been or are being replaced by software entities that access the physical commodities of a network, and/or other software entities of the network, on an "as need" basis to communicate with each other and cooperate to provide functions required by the networks. The software entities are conventionally referred to as "virtual elements", with a particular virtual element typically distinguished by a name of a function it provides. The functions that the virtual entities provide are conventionally referred to as "virtual network functions" (VNF) or "virtual network elements" (virtual NEs). The processes of creating and managing physical resources to provide the virtual network functions may be referred to as "Network Functions Virtualization" (NFV), and emergent networks that incorporate the virtualizations, may be referred to as "Software Defined Networks" (SDNs).

Virtualization of various hardware entities and functions have been suggested for, and partially adopted by current fourth generation (4G) long term evolution (LTE) communications networks. Fifth generation (5G) communications and data processing technologies and architectures that are in development and are in the early stages of deployment are conceptually completely virtualized, software defined networks (SDNs).

The current extensive, complex infrastructure of 4G and nascent 5G communications comprising dedicated physical devices and an ever increasing, if not dominant number, of virtual NEs engage in an incessant exchange chatter approaching exchange of thousands of gigabits per second (Gbps). Monitoring and troubleshooting the networks as much as possible in real time to maintain performance that provides acceptable quality of service (QoS) and user quality of experience (QoE) for the multitude of services that the networks provide has become an ever more demanding challenge.

SUMMARY

An aspect of an embodiment of the disclosure relates to providing a storage architecture for storing data relevant to operations of a communications network that is advantageous for accessing and processing the data, and a new generation node (NG-node) configured to collect and generate the relevant data.

In an embodiment, the storage architecture comprises a stateless data store and a stateful data store. The relevant data comprises data referred to as stateless data and stateful data. The NG-node extracts and/or generates from contents of a protocol data unit (PDU) generated by an entity or user of the network, which the NG-node captures or receives, processes, and/or stores in the stateless and stateful stores respectively. Hereinafter, "capture" and "receives", may generically be referred to as "acquires", and "extracts and/or generates" may be referred to generically by "extracts". Unless otherwise indicated, reference to "data" in a PDU is a generic reference for information in any of the fields of a PDU.

In an embodiment, stateful data that the NG-node extracts from a PDU that the NG-node acquires and transmits to the stateful store, also referred to as an stateful ID-index store, for storage as a "stateful record" comprises an identifier index (ID-index) vector, that is stored in the stateful store with a reference to a time period relevant to the PDU. The ID-index vector may comprise a value for at least one permanent identifier, also referred to as a permanent ID-index, from a set of permanent ID-indices, and at least one temporary ID identifier, also referred to as a temporary ID-index, from a set of temporary ID-indices. The at least one temporary ID identifier may comprise a first temporary ID identifier and a subsequent second temporary identifier that replaces the first identifier.

Permanent ID-indices are permanent identifiers that identify entities, also referred to as "source" entities that are sources of activities of a communications network for which the network provides services and/or dedicated entities that define and/or enable the services, and to which in general, most if not all communications supported by the network and data generated responsive to the communications may be traced. Permanent ID-indices, in accordance with an embodiment of the disclosure may for example identify such source entities as subscribers to a communication network, their respective user equipment, and service packages to which subscribers subscribe. In 4G and 5G networks subscribers are respectively identified by permanent ID-indices referred to as IMSIs (International Mobile Subscriber Identity) and SUPIs (Subscription Permanent Identifier). An IMEI (International Mobile Equipment Identifier) is a permanent ID-index that identifies a user's equipment in a 4G network, and a corresponding permanent index PEI (Permanent Equipment Identifier) in a 5G network. A permanent ID-index MSISDN (Mobile Station International Subscriber Directory Number) identifies a service package to which a subscriber to the networks subscribes.

Temporary ID-indices in accordance with an embodiment are identifiers of temporary, ephemeral, features of a communications network. Temporary ID-indices in accordance with an embodiment comprise temporary aliases that networks assign to anonymize permanent ID-indices, ID-indices that identify network elements (NEs), and ID-indices that identify constructs of NEs or services which NEs provide to support an activity of a user for a limited time. For example, to protect user identities, IMSIs are generally assigned temporary aliases referred to as Globally Unique Temporary Identities (GUTIs), which are periodically changed to maintain user confidentiality. By way of another example, a temporary ID-index may be a unique GTP-C Tunnel End Identifier (TEID) that identifies a GTP control plane connection between a pair of network elements.

The stateful ID-index store is optionally configured so that no more than one copy of identical ID-index vectors received by the store for storage for a same relevant time period is stored in the store. The time period and its associated ID-index vector stored in the stateful store may collectively be referred to as an ID-index record, and the stateful store may be referred to as a stateful ID-index store.

In an embodiment, stateless data that the NG-node extracts from a given PDU that the NG-node acquires and transmits to the stateless store for storage as a "stateless record" optionally includes a copy of the given PDU and an associated index vector, also referred to as a Base-index vector. The Base-index vector comprises a value for at least one intrinsic Base-index, from a set of intrinsic Base-indices that may be used to characterize an attribute of the PDU. An at least one intrinsic Base-index comprises at least one index that is also an ID-index stored in the stateful ID-index store so that the given PDU may be associated with a permanent stateful ID-index stored in the stateful ID-index store. By way of example, an intrinsic Base-index for a PDU that is a 4G or 5G packet may be a GUTI, a relevant time stamp, a protocol that configures the PDU, an address that directs propagation of the PDU over the network, or a type of transaction to which the PDU belongs. The stateless record for the given PDU is stored without reference to stateless records stored in the store for other PDUs. A stateless record may be referred to as a Base-index record and the stateless store may be referred to as a stateless Base-index store.

A Base-index record may be composed to comprise in addition to a value for at least one intrinsic Base-index, a value for at least one elective Base-index. An elective Base-index may be any index generated in response to a query PDU that designates a feature of a PDU stored in the stateless Base-index store for which a value may be of interest to a user of the stateless Base-index store. A value for an elective index for a given Base-index record may be extracted from the copy of the PDU associated with the Base-index record.

A storage configuration comprising a stateless Base-index store and related stateful ID-index store in accordance with an embodiment of the disclosure may be referred to as a Tiered Index Store.

In accordance with an embodiment a query to retrieve information with respect to operation of the communications network is constructed to comprise at least one constraint on an intrinsic and/or elective Base-index of records stored in the stateless Base-index store, and/or an ID-index of records stored in the stateful ID-index store. The at least one constraint on the indices operates to reduce a number of records associated with PDUs generated by operation of the communications network and stored in the stateless Base-index store that may have to be searched to provide an appropriate response to the query.

In accordance with an embodiment of the disclosure the NG-node comprises a containerized set of components that may be instantiated to a communications network to process data to compose Base-index records and ID-index records for a Tiered Index Store associated with the network.

The set of components optionally comprises a PDU input source, a universal preprocessor, a multimode batch and/or stream processor, an output sink and a local memory that stores data and executable instructions that support functionalities that the NG-node provides.

The input source is configurable to acquire any of various types and configurations of streamed PDUs that may be generated by an NE of a communications network. The universal preprocessor is configurable to receive PDUs acquired by the source and provide preprocessing functionalities such as parsing, mapping, and/or formatting their respective contents. In an embodiment the preprocessor may be configured to format the contents of a received PDU to a standard format for use by the processor, other NG-nodes, or a user. The multimode processor may be used in a stream and/or batch processing mode to process PDUs that may be received from the input source, the universal preprocessor, or data from a local stateless store. The output sink is configurable to transmit data from a PDU received by the input source, generally after processing by a component entity of the NG-node to any of various destinations.

In an embodiment an NG-node may be a module embedded in software of a bare-metal entity, configured as a side car in a same host that hosts a given virtual network function (VNF) or functions from which the NG-node is configured to acquire PDUs, or as a remote entity hosted in a host different from that that hosts the given VNF. In accordance with an embodiment of the disclosure a plurality of NG-nodes may configured in a suitable topology to communicate and cooperate with each other to perform a desired networking task. Optionally, the topology is a hierarchical topology in which at least one NG-node, functions as a taskmaster NG-node delegates tasks to at least one subservient worker NG-node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

In the following description, details of a Tiered Index Store and NG-nodes operating in accordance with embodiments of the disclosure to process data generated by communications networks are discussed with reference to FIGS. 1-6B.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

Figure 1A:
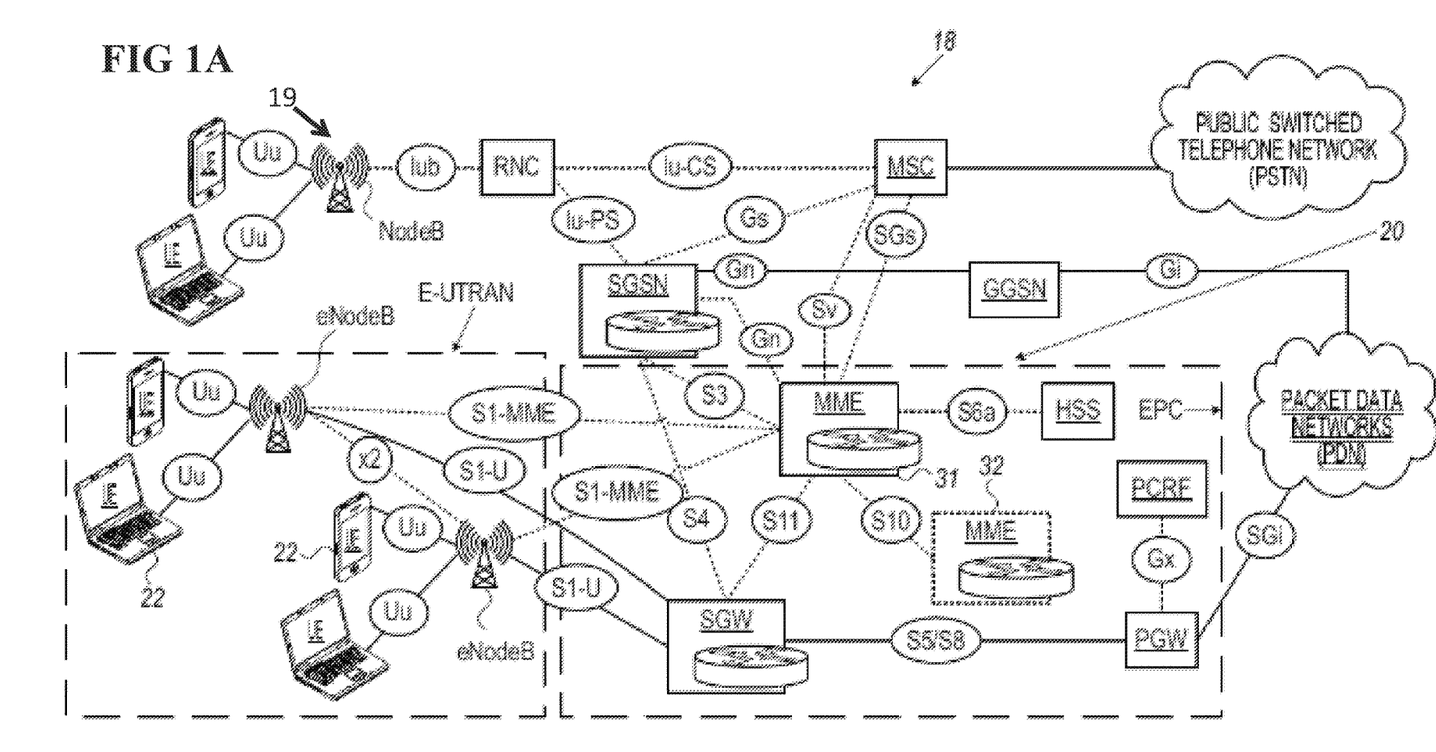
FIG. 1A schematically shows a long-term evolution, 4G LTE, communications network.

FIG. 1 schematically shows network elements comprised in a mobile communication network 18 comprising a 3rd Generation Wireless Mobile Communication (3G) network 19 and an evolved packet system (EPS) communications network 20 that operates to connect a user's mobile communication equipment, (UE) to one or more Packet Data Networks (PDNs), and/or, as a circuit switch fallback option, to the Public Switched Telephone Network (PSTN). Network 20 may operate to provide a user's UE with communications to the Internet and/or to stationary and/or mobile communication equipment of other users (not shown). In FIG. 1 mobile user equipment, UE, is schematically represented by smartphone and laptop icons 22.

EPS network 20 comprises a packet switched core network referred to as an Evolved Packet Core (EPC) core network indicated by a dashed boundary labeled EPC and a Long Term Evolution (LTE) radio access network referred to as an Evolved Universal Terrestrial Radio Access Network E-UTRAN indicated by a dashed boundary labeled E-UTRAN. E-UTRAN provides user equipment with wireless radio frequency (RF) channel connectivity to the core network EPC. The core network EPC provides a UE connected to the core network via an E-UTRAN radio channel with a communications connection to a PDN via an internet protocol (IP) packet flow "pipeline", conventionally referred to as a "bearer". The acronym LTE is conventionally used when referring to an evolved packet system (EPS) network comprising both the LTE E-UTRAN and the evolved packet core EPC, and network 20 shown in FIG. 1 may be referred to as LTE network 20, or simply LTE.

E-UTRAN comprises a network of RF communication base stations referred to as evolved NodeB (eNodeB) base stations. Each eNodeB comprises an RF transceiver and integral controller that controls the RF transceiver to establish radio communication channels between UEs in a limited geographic region referred to as a cell, and the core network EPC. Legacy base stations, referred to as NodeB base stations used in 3G networks, do not comprise integral controllers but are connected to radio network controllers (RNCs), operate using RF transmission technologies different from those used by eNodeBs and have limited functionalities in comparison to eNodeB base stations. Core network EPC is capable of communicating with and connecting a UE connected to a NodeB with a PDN network, and LTE network 20 is schematically shown connected to a NodeB base station of 3G network 19 via an RNC and a Serving GPRS (General Packet Radio Service) Support Node, (SGSN) of the 3G network. The SGSN node is responsible for delivery of packets from and to UEs that are connected to a NodeB base station rather than an eNodeB base station. The SGSN is connected to the Internet via a GGSN (GPRS Gateway Support Node). Whereas in FIG. 1 mobile network 18 is shown comprising a E-UTRAN having two eNodeBs and a 3G network having one NodeB, an LTE may and typically does comprise more than two eNodeBs and a 3G network comprising more than one NodeB.

Core network EPC of LTE 20 comprises a plurality of logical nodes, which are supported by virtual and/or physical network elements. The network nodes include, a Serving Gateway (SGW), a PDN gateway (PGW), a Home Subscriber Server (HSS), a Mobile Switching Center (MSC) server, and a Mobile Management Entity (MME). The SGW is a node of the LTE network through which data packets from a UE connected to an eNodeB enter the EPC to be propagated from the UE through the EPC to their destinations, or exit the EPC to propagate to the eNodeB and the UE after propagating through the EPC from their sources. The SGW serves as a local mobility anchor for data bearers when the UE moves between cells of different eNodeBs. The PGW is a node through which UE data packets from a UE connected to the EPC exit the EPC to propagate to a PDN or enter the EPC from a PDN to propagate to the UE. The PGW is responsible for allocating an IP address to the UE and handling various administrative and charging tasks in accordance with information received by the PGW from a node referred to as a Policy and Charging Rules Function (PCRF) node. The HSS node contains user subscription data, such as a QoS profile and any restriction that might limit user roaming. The HSS also contains dynamic information such as an identity of an MME to which the user UE may currently be connected. The MSC node supports signaling between an MME and a UE Subscriber Identity Module (SIM) and Short Message Services (SMS) for a UE connected to the EPC via a NodeB.

The MME is a central control and signaling-node that communicates with and orchestrates the activities of the other nodes and the UE in managing the resources of the LTE to establish, route, and maintain IP packet flow between a UE and a PDN. An EPC generally comprises more than one MME and may hand over connection to a UE from one to another of the MMES as the UE moves between cells of different eNodeBs. In FIG. 1 LTE 20 is shown comprising two MMEs, a first MME 31 represented by a solid line rectangle and indicated by dotted lines as communicating with UEs shown in the figures, and a second MME 32, shown in dashed lines, to which first MME 31 may hand over UEs as the UEs move between cells.

Communication between two nodes in an LTE network is governed by an interface that configures what data the nodes exchange, how packets that contain the data are formatted, and how the packets are transmitted between the nodes. Communication between different node pairs is typically governed by different interfaces. An interface that configures communications between two nodes is indicated in FIG. 1 by an alphanumeric identifying the interface shown in an ellipse overlying a dashed or solid line that extends between the two nodes. For example, eNodeBs in an LTE network exchange control signaling using an X2 interface, and an X2 is shown in an ellipse overlying a dashed line shown connecting the two eNodeBs in LTE network 20, and a UE communicates with an eNodeB via a Uu interface shown in an ellipse overlying a solid line between the UE and the eNodeB. Similarly as indicated in FIG. 1, the MME node communicates control data with an eNodeB via an S1-MME interface. The S1-MME interface defines data to be exchanged and packet formatting in accordance with an S1-AP protocol and configures transmission of the data between the MME and the eNodeB using the SCTP (Stream Control Transmission Protocol) transport protocol. The MME node communicates with the SGW node via an S11 interface, which tunnels UDP packets between the nodes using a General Packet Radio Service Tunneling Protocol (GTP) referred to as GTP-C. And, the HSS communicates with the MME via an Sha interface that configures data in accordance with a Diameter protocol and transmits Diameter messages using SCTP.

Figure 1B:
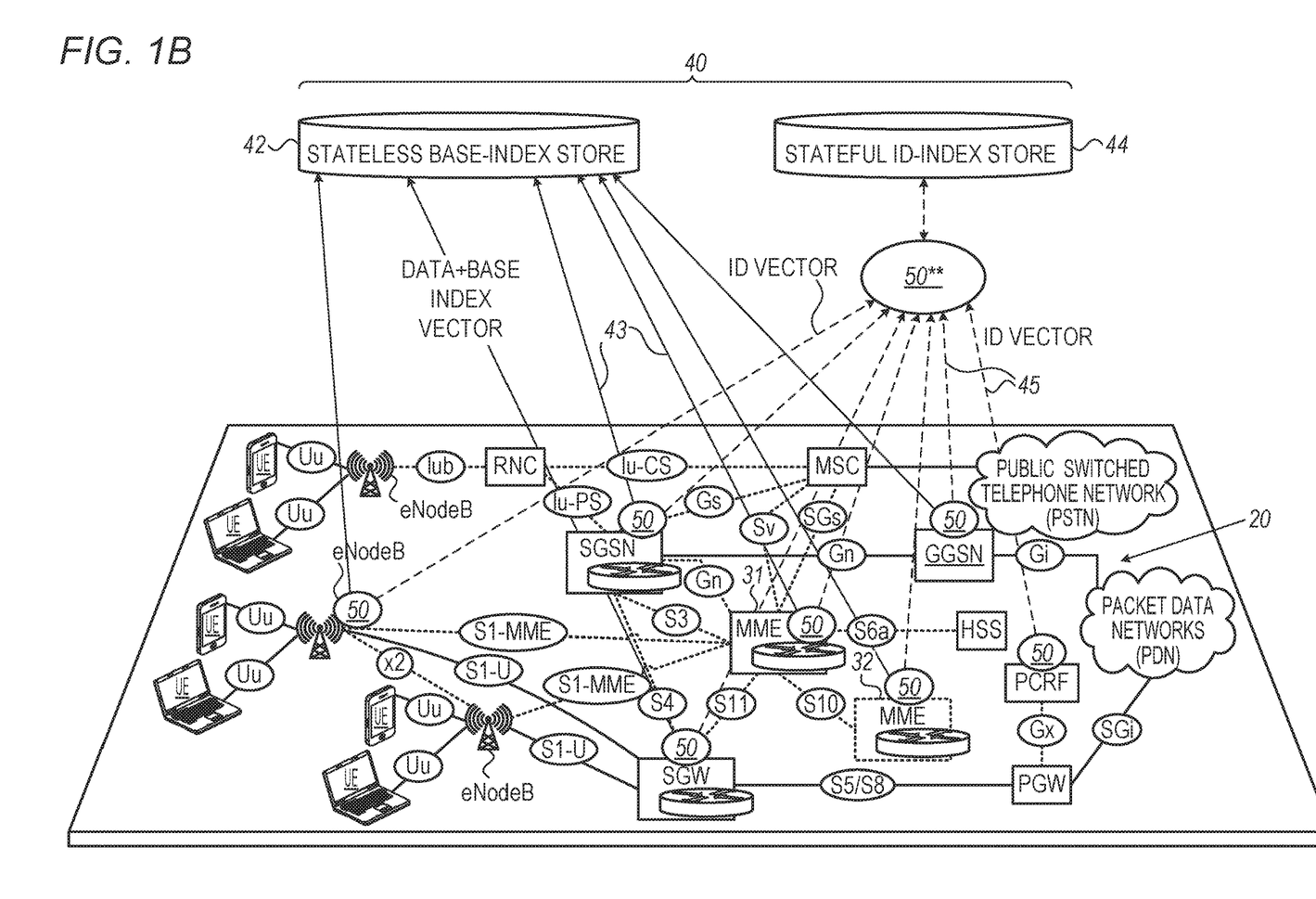
FIG. 1B schematically shows NG-nodes, and a Tiered Index Store comprising a shared stateless Base-index store and a stateful ID-index store cooperating to provide a queryable storage configuration for monitoring performance of the 4G LTE shown in FIG. 1A, in accordance with an embodiment of the disclosure.

FIG. 1B schematically shows a queryable, Tiered Index Store 40 comprising a stateless Base-index store 42 and a stateful ID-index store 44, a plurality of NG-nodes 50 coupled to a 4G network 20 similar to that shown in FIG. 1A. Optionally, the plurality of NG-nodes 50 comprises a set of NG-nodes 50 each of which is coupled to a different network entity (NE), such as optionally an MME or GGSN as shown in FIG. 1B and a node 50 individualized by a label 50 that acts as a hub NG-node. Each NG-node 50 is configured to acquire and process PDUs that the NE to which it is coupled generates and to compose respective stateless records for the PDUs. A stateless record for a given PDU comprises a copy of the PDU or a portion of data included in the PDU, a time stamp and a Base-index vector associated with the PDU. NG-node 50 stores a copy of the stateless record in stateless Base-index store 42 that the NG-node shares with other NG-nodes. Stateless records that NG-nodes 50 compose and store in stateless Base-index store 42 are schematically represented by solid line arrows 43 extending from the respective NG-nodes to the stateless Base-index store. In accordance with an embodiment, the NG-node also composes for the given PDU a stateful record comprising an ID-index vector associated with the given PDU and the associated time stamp and transmits the stateful record to hub NG-node 50. Hub NG-node 50 checks records stored in stateful ID-index store 44, and if the stateful ID-index store does not comprise a stored stateful record having an ID-index vector that is the same as the ID-index vector in the stateful record composed for the given PDU, stores the composed stateful record in stateful ID-index store 44. Otherwise hub node 50 discards the stateful record composed for the given PDU. Stateful ID-index records that NG-nodes 50 compose and transmits to NG-node hub 50 for storage in stateful ID-index store 44 are schematically represented by dashed line arrows 45 extending from the respective NG-nodes to NG-node hub 50.

An NG-node 50 in accordance with an embodiment may be configured and coupled to an associated bare metal NE of communications network 20 as an embedded software module or as module that taps an interface that connects the NE to other NEs of the communications network. 20. An NG-node 50 in accordance with an embodiment may be configured as a container and optionally be coupled to a virtual NE of communications network 20 as a side car to the virtual NE hosted in a same host that hosts the virtual NE. The container may be hosted in a same host or a host different from that that hosts the virtual NE host and be configured to tap an interface that connects the virtual NE to other NEs of the communications network, or may be connected to an API (application programming interface) that the virtual NE includes to access the NE and capture PDUs that the NE generates. Details of Base-index vectors and ID-index vectors and their respective components are discussed with reference to FIGS. 3A and 3B. An algorithm by which NG-nodes operate to compose Base and ID-index vectors is discussed with reference to FIG. 4.

Figure 1C:
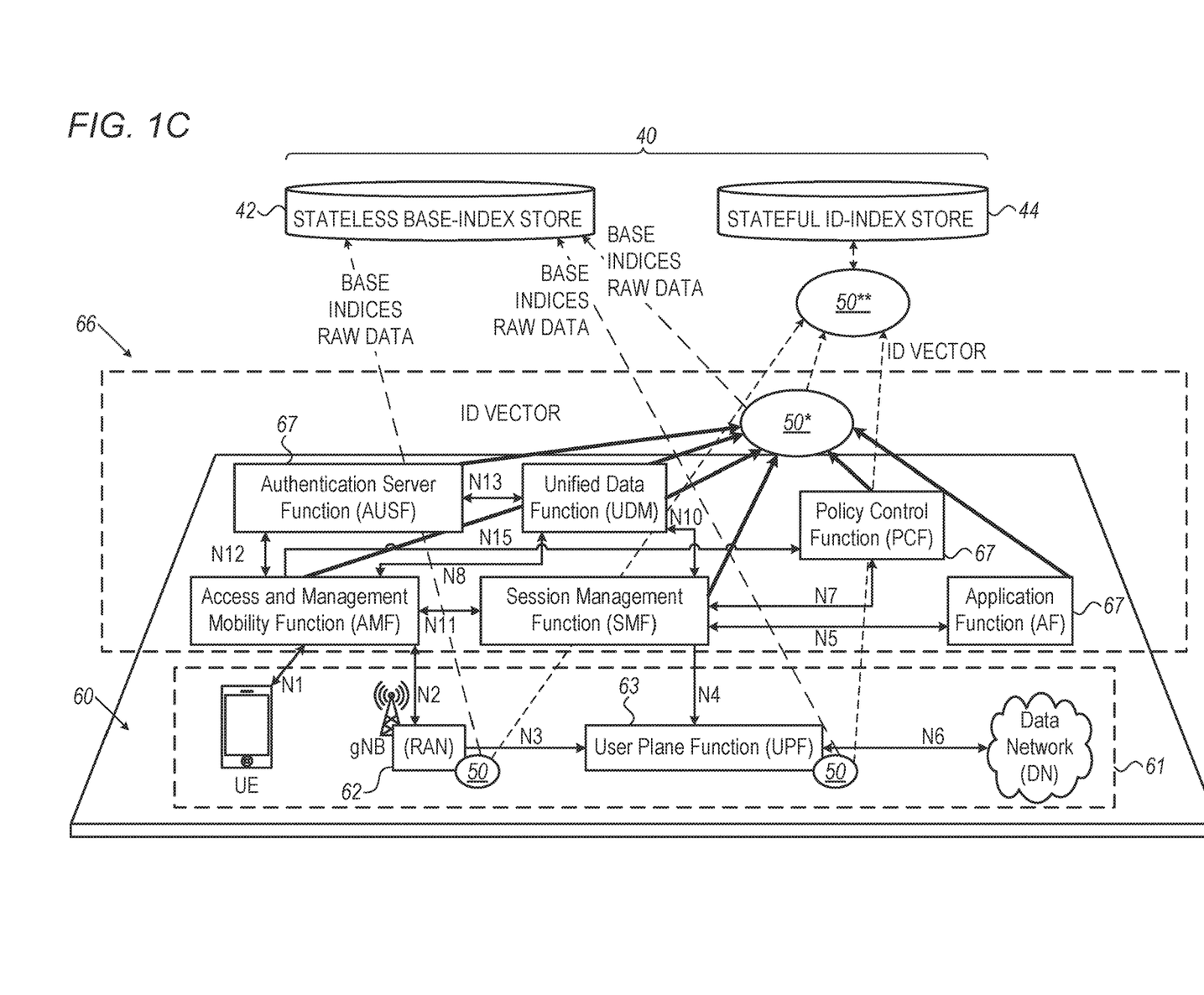
FIG. 1C schematically shows NG-nodes, a Tiered Index Store store cooperating to provide a queryable storage configuration for monitoring performance of a 5G communications network, in accordance with an embodiment of the disclosure.

FIG. 1C shows Tiered Index Store 40, stateless Base and stateful ID-index stores 42 and 44, and a plurality of NG-nodes coupled to NEs of a 5G network 60 in accordance with an embodiment of the disclosure. 5G network 60 comprises a user plane (UP) schematically indicated by a dashed boundary 61 and a control plane (CP) schematically represented by a dashed boundary 66. The user and control planes may be referred to by the numerals that label their respective dashed line boundaries. User plane 61 comprises a radio access network (RAN) 62 and a plurality of cloud resident virtualized NEs 63 referred to as user plane functions (UPF) 63 each represented in FIG. 1C for convenience by a single rectangular icon labeled 63. Control plane 66 comprises a plurality of cloud resident, virtual NEs 67 that may be referred to as control plane functions (CPFs) 67 individually represented by a respective rectangular icon labeled with a control plane function name. RAN 62, user plane functions 63, and control plane functions 67 communicate with each other in accordance with point to point interfaces conventionally labeled by an alphanumeric label N1, N2, N3 . . . as shown in FIG. 1C. Within control plane 66 network functions communicate with each other via service-based interfaces (SBIs) such as by way of example, Namf (Network Access and Mobility Management Function), Nnef (Network Exposure Function), Nudm (Network Unified Data Management).

In an embodiment each NG-node 50 is coupled to only one UPF 63, acquires PDUs generated by the UPF, and composes stateless records for the acquired PDUs that include for each respective PDU a copy of at least some of the data, also referred to as raw data, comprised in the PDU together with an associated Base-index vector and time stamp. The NG-node stores the stateless records in stateless Base-index store 42. Each NG-node 50 coupled to a UPF 63 may also compose and store a stateful record comprising an ID-index vector for an acquired PDU and transmit the composed record to hub NG-node 50** for storage in stateful ID-index store 44 if the stateful ID-index store does not already comprise a record having an ID-index vector the same as that in the composed record.

In an embodiment an NG-node 50 individualized by a double asterisk and referred to as an aggregating NG-node 50\* operates to acquire PDUs generated by each of a plurality of control plane virtual NEs 67. Similar to NG-nodes 50, aggregating NG-node 50\* processes the acquired control plane PDUs to compose a stateless record for each respective control plane PDU that includes a copy of at least some of the data comprised in the PDU together with an associated Base-index vector. NG-node 50\* may transfer stateless records it composes to stateless base index store 42. NG-node aggregating NG-node 50\* may also compose a stateful record comprising an ID-index vector for an acquired control plane PDU and transmit the stateful record for storage in stateful ID-index store 44.

In an embodiment an NG-node 50 coupled to a user plane UPF 63 may be coupled to the UPF in a manner similar to that in which NG-nodes 50 in communications network 20 are connected to virtual NEs. Aggregating NG-node 50\* may couple to a given control plane function CPF 67 by tapping an interface of the CPF or via an API that the CPF comprises.

Figure 2:
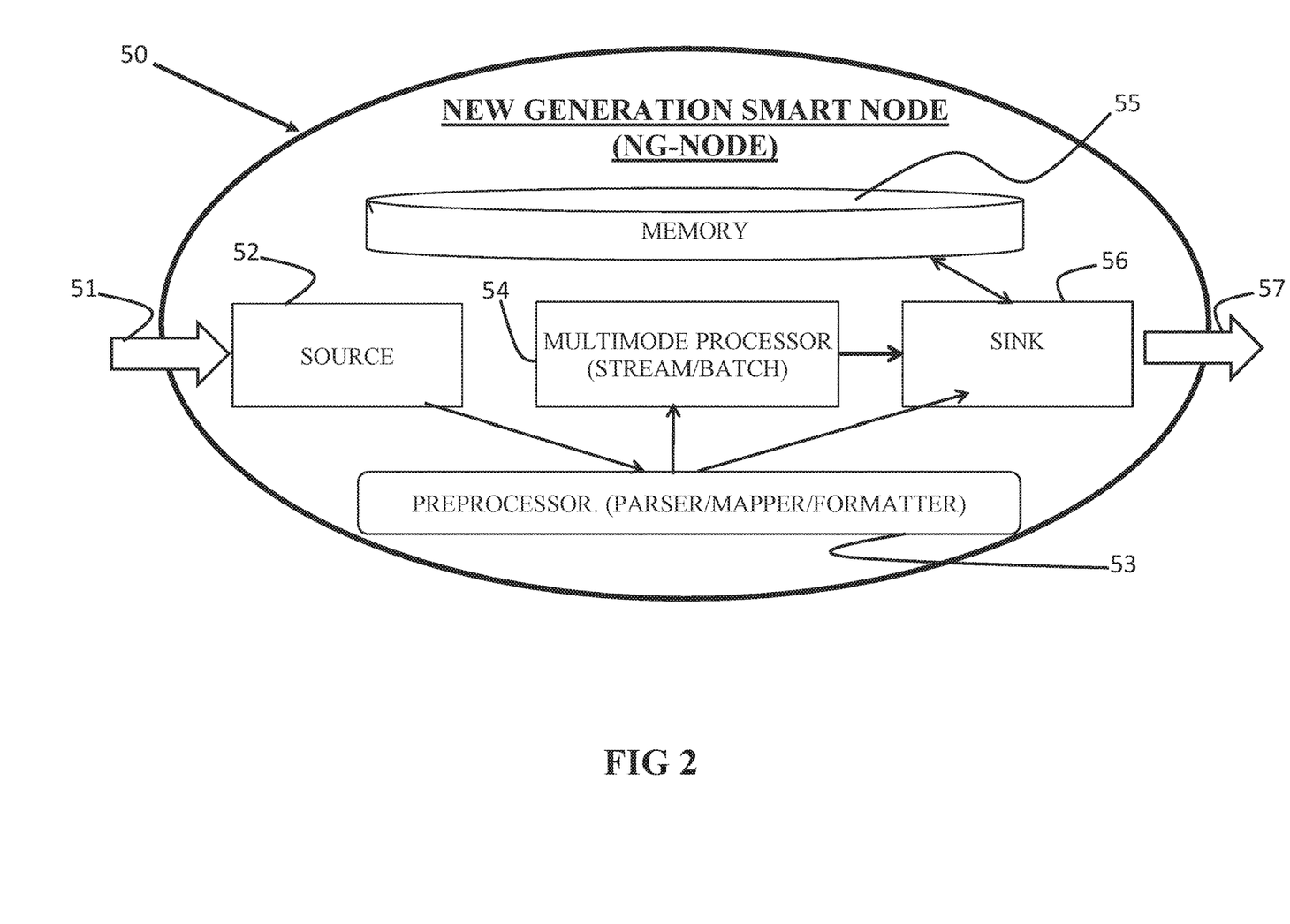
FIG. 2 schematically shows details of an NG-node similar to NG-nodes shown in FIGS. 1B and 1C, in accordance with an embodiment of the disclosure.

FIG. 2 schematically shows details of a containerized NG node 50 that support functioning of the NG-node in accordance with an embodiment of the disclosure. NG-node 50 optionally comprises a source 52, a preprocessor 53, a multimode processor 54, a local stateless Base-index store 55, and a sink 56. Source 52 is operable to acquire PDUs from a NE that NG-node monitors and forward the acquired PDUs to preprocessor 53. A block arrow 51 schematically represents acquisition of a PDU or a stream of PDUs. Source 52 is configurable to acquire PDUs in accordance with any of a plurality of desired protocols and from any of a variety of NEs. For example source 52 may be configurable to acquire PDUs configured in accordance with protocols defined by any of interfaces defined for G4 LTE communications network 20, such as by way of example S1-U, S5/S8, or Gx, shown in FIGS. 1A and 1B, service based interfaces or point to point interfaces defined for 5G network 60, diagnostic tools such as OpenTracing, and any of various Event Data Records (EDRs) that might be provided by network functions. Preprocessor 53 is operable to parse, map, and format data in PDUs that the preprocessor receives from source 52 and may operate to conform the data to a common format such as an AVRO format for processing by multimode processor 54. Multimode processor 54 is operable to receive data from preprocessor 53 for a given PDU and process the data that the preprocessor provides from PDUs acquired by source 52 to extract values for time stamps, Base-indices and ID-indices and use the values to compose Base-index vectors and ID-index vectors. In an embodiment the multimode processor forwards stateless Base-index and stateful ID-index records comprising the Base and ID-index vectors respectively to sink 56. Sink 56 forwards the Base-index records for storage in stateless Base-index store 42 shown in FIGS. 1B and 1C. Sink 56 transmits ID-index records for storage in stateful ID-index store 44 shown in FIGS. 1B and 1C.

Figure 3A:
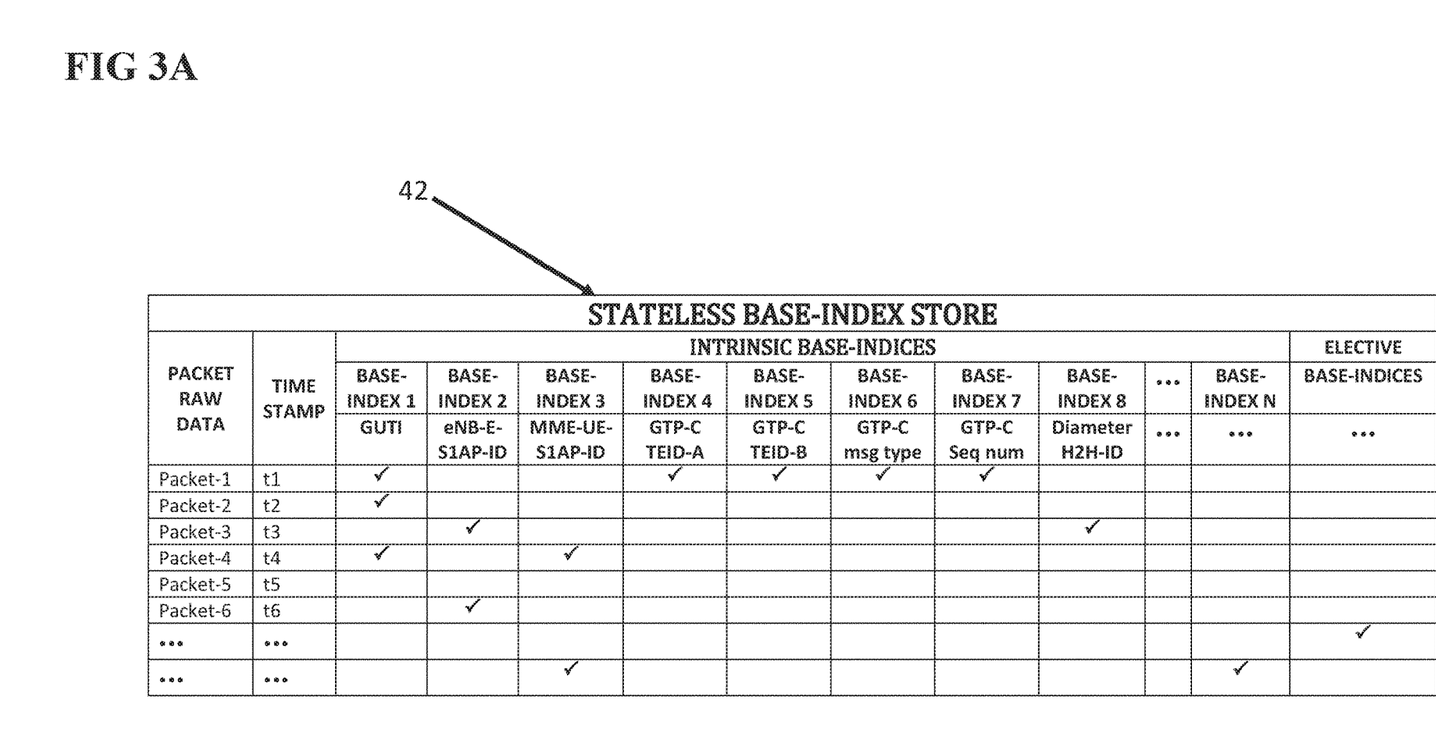
FIG. 3A schematically show details of a stateless Base-index store in accordance with an embodiment of the disclosure.
Figure 3B:
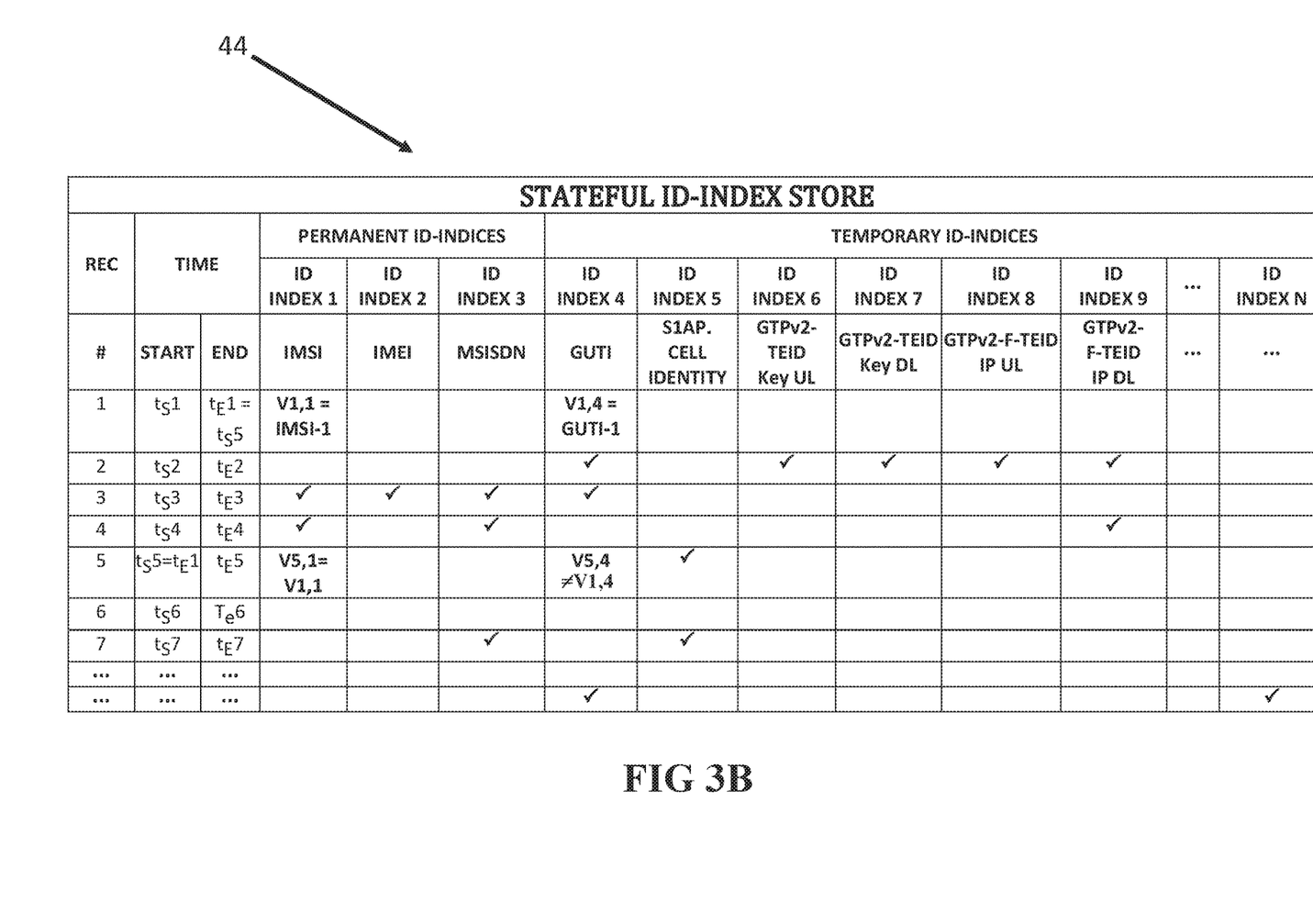
FIG. 3B schematically show details of a stateful ID-index store in accordance with an embodiment of the disclosure.

FIGS. 3A and 3B illustrate storage of stateless Base-index records and stateful ID-index records in a shared stateless Base-index store 42 and stateful ID-index store 44 schematically represented by tables labeled by the numbers labeling the stores that the tables respectively represent, in accordance with an embodiment of the disclosure. For convenience of presentation records stored in the stores are assumed to be composed by NG-nodes 50 for PDUs that are packets transmitted over a 4G communications network such as LTE network 20 (FIGS. 1A, 1B).

A Base-index record stored in stateless Base-index store 42 for a given packet includes values entered in a same row of table 42 and optionally comprises a copy of the packet or a portion of data that the packet comprises, hereinafter also referred to as raw data, a time stamp, and a value for a component of an intrinsic Base-index vector. A copy of the given packet or a portion of data in the packet is indicated in Base-index table 42 by an entry in a cell in a column headed "PACKET RAW DATA" of the table in the row of the table for which values are entered for the packet. A time stamp of the packet is indicated in the packet row by an entry in a column labeled "TIME STAMP". Intrinsic Base-indices for which values for the packet are entered in the table, are shown by way of example as "N" example Base-indices, of which Base-indices 1, 2, . . . 8 are optionally GUTI, eNB-E-S1AP-ID, MME-UE-S1AP-ID, GTP-C-TEID-A, GTP-C-TEID-B, GTP-C msg-type, GTP-C Seq num and Diameter H2H-ID. A check mark in a cell in the packet row and in a column headed by a designation for a given Base-index represents a value entered into the table that the packet comprised for the given Base-index. For example, the entry "Packet-1" in the column headed RAW DATA in a first row of table 42 represents raw data for a "first" packet, $t_1$ a time stamp for the packet, and the check marks in the packet row indicate that the packet comprised values for intrinsic Base-indices 2, 6, 7, 8 and 9, which were entered into Base-index store.

Values for intrinsic Base-indices in stateless Base-index store 42 for a given packet may be used to associate the given packet with other packets propagated in a communications session between NEs in LTE communications network 20 and/or a permanent ID-index listed in stateful ID-index store 44 that identifies a source entity of network 20.

A stateful ID-index record stored in stateful ID-index store 44 for a given packet comprises an ID-index vector having values that the given packet includes for ID-indices of an ID-index vector that are entered in a same row of table 44 and start and end times for the ID-index vector. The ID-index vector may comprise a value for at least one permanent ID-index of a plurality of permanent ID-indices, and a value for at least one temporary ID-index of a plurality of temporary ID-indices for which values may be entered into table 44. Alternatively, or additionally the ID-index vector may comprise a value for each of a first temporary ID-index and a second temporary index that replaces the first temporary index. For example, an ID-index vector may comprise a first GUTI and a second GUTI that replaces the first GUTI. Optionally, the permanent ID-indices comprise three permanent indices, noted by way of example in table 44 as ID-indices, 1, 2, 3 for a packet IMSI, IMEI, and MSIDSN. Optionally, the temporary ID-indices comprise a plurality of N ID-indices, 4, 5, . . . 9 for a packet GUTI, S1AP.CELL IDENTITY, GTPv2-TEID Key UL, GTPv2-TEID Key DL, GTPv2-F-TEID IP UL, GTPv2-F-TEID IP DL.

The start time for a given ID-index vector stored in table 44 is a time at which the ID-index vector was first exhibited by a packet propagated over the network. An end time for the given ID-index vector is a time at which an ID-index vector having a same permanent ID-index as the given ID-index vector but at least one temporary ID-index different from that of the given ID-index vector is first exhibited by a packet propagated over the network.

By way of example, stateful record 1 in stateful ID-index store 44 for a packet 1 has a start time $t_S1$, and an end time $t_E1$, which is indicated as being equal to a start time $t_S5$ of a packet 5, an IMSI (ID-index 1) having value $V_{1,1}$ and a GUTI (ID-index 4) having a value $V_{1,4}$. The first and second subscripts of value V indicate a row and column respectively in table 44, which row and column respectively identify a particular packet and particular ID-index in the table. Stateful record 5 in ID-index store 44 for a packet 5 has the same values for permanent ID-indices that stateful record 1 has: IMSI (ID-index 1) $V_{5,1}=V_{1,1}$. However, packet 5 has a GUTI (ID-index 4) having a value $V_{5,4} \neq V_{1,4}$. The appearance of packet 5 with a same IMSI as that of packet 1 but different GUTI therefore stopped the clock for packet 1 at an end time equal to $t_S5$.

Figure 4:
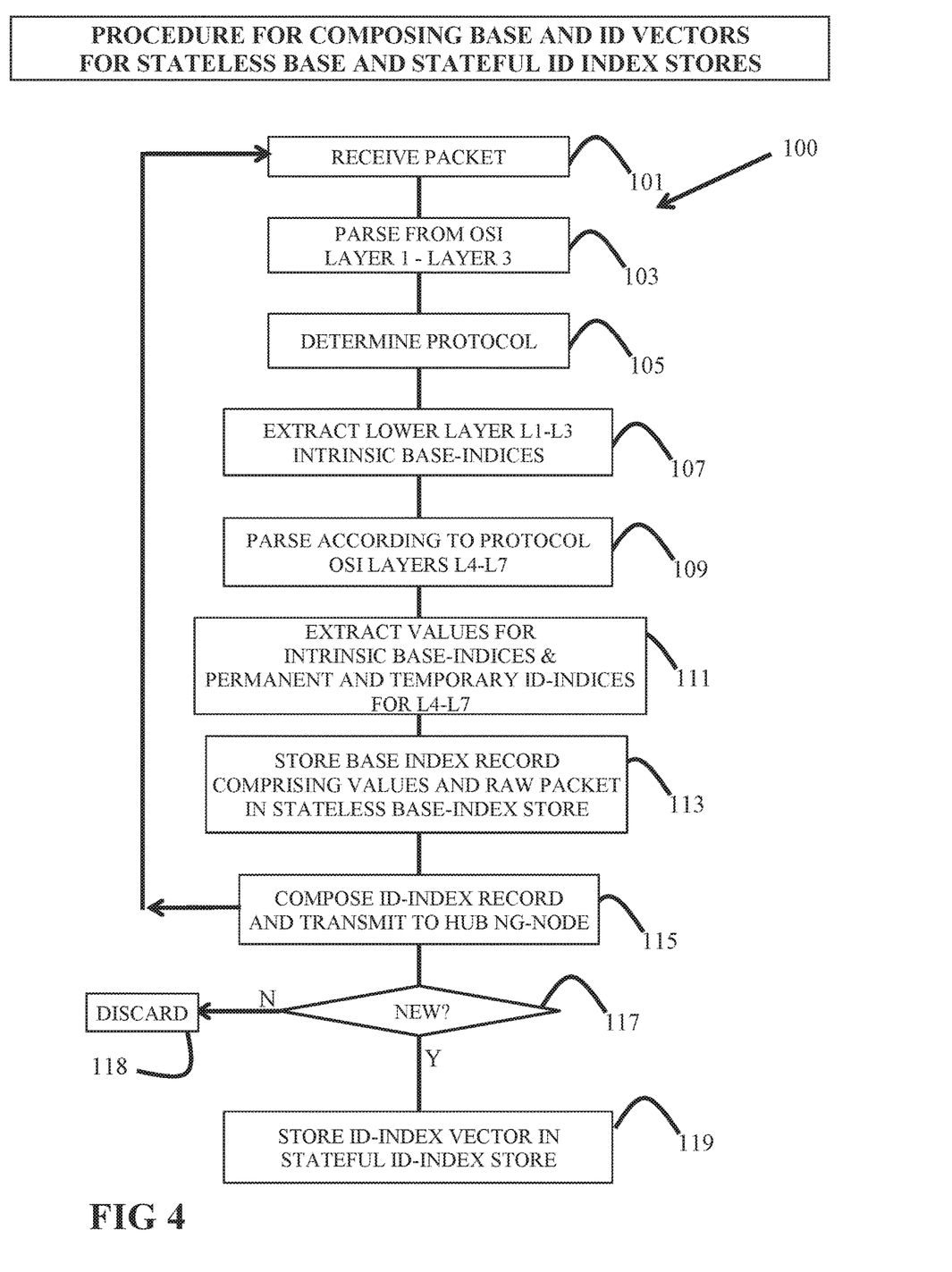
FIG. 4 shows a flow diagram of a procedure by which an NG-node similar to NG-nodes shown in FIG. 2A-FIG. 3 operates to store Base-index and ID-index records in stateless Base-index and stateful ID-index stores respectively, in accordance with an embodiment of the disclosure.

FIG. 4 shows a procedure 100 by which an NG-node 50 composes and operates to store in stateless Base-index store 42 and stateful ID-index store 44 Base and ID-index vectors respectively responsive to data comprised in a PDU that the NG-node acquires.

In a block 101 NG-node 50 receives a PDU, which for convenience of presentation is assumed to be a packet, from a NE in 4G LTE communications network 20 to which the NG-node is coupled. Optionally in a block 103 the NG-node parses the packet to identify headers relevant to propagation of the packet in the lower L1-L3 layers of the OSI (Open Systems Interconnection) model, and in a block 105 determines the protocols according to which data in the headers are formatted. In a block 107 NG-node 50 uses the determined protocols to process the headers and extract values for lower layer intrinsic Base-indices and permanent ID-indices. In a block 109 NG-node 50 may parse the packet to identify relevant headers for layers 4-7 and in block 111 may extract values for intrinsic Base-indices and permanent and temporary ID-indices associated with OSI layers L4-L7. In a block 113 the NG-node may compose and store in the stateless Base-index store 42 (FIG. 3A) a Base-index record that includes a time stamp, at least a portion of the raw data comprised in the packet, and a Base-index vector comprising the intrinsic Base-index values that the NG-node extracted from the packet. In a block 115 NG-node 50 composes an ID-index record comprising an ID-index vector having values for the permanent and temporary ID-indices that NG-node 50 extracted from the packet and transmits the ID-index record to hub NG-node 50\*\* (FIGS. 1B, 1C). From block 115 NG-node returns to block 101 to receive another packet.

In a decision block 117 hub NG-node 50\*\* polls ID-index store 44 to determine if the composed ID-index record received from NG-node 50 comprises an ID-index vector is a new vector that is not already stored in the stateful ID-index store. If the ID-index vector is not new, hub NG-node 50\*\* proceeds to a block 118, discards the ID-index record and awaits receipt of another ID-index record from an NG-node. If on the other hand the vector is new, in a block 119 hub NG-node 50\*\* stores in ID-index store 44 an ID-index record comprising the new ID-index vector and a time stamp of the packet from which the ID-index vector was composed and awaits receipt of another ID-index record from an NG-node. The time stamp may be used as a start time for the new record stored in ID-index store 44 and may be used as an end time for a record previously stored in ID-index store 44 having same permanent indices that the newly stored record has.

Figure 5:
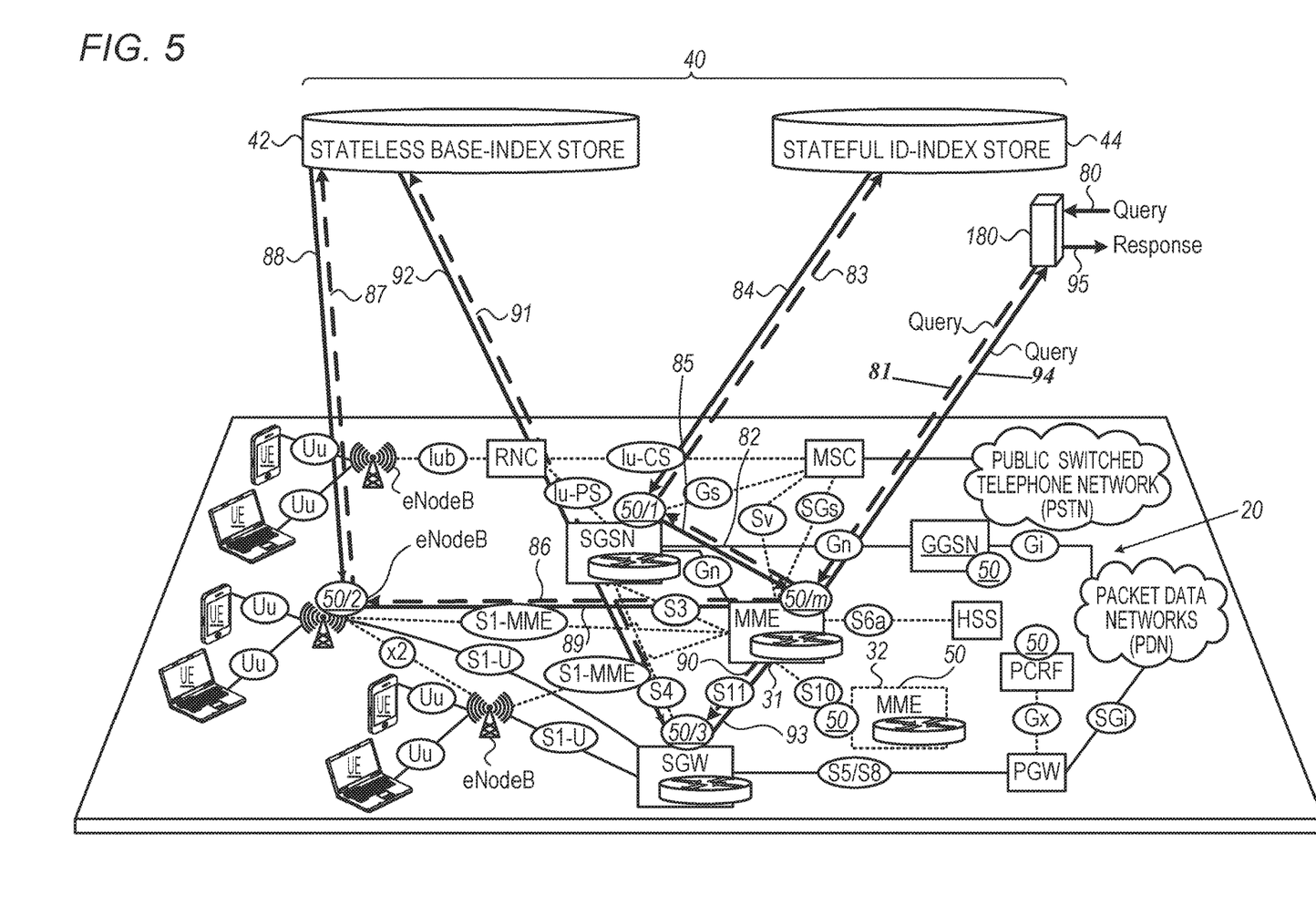
FIG. 5 schematically shows a plurality of NG-nodes configured in a hierarchical topology comprising a manager and subservient worker NG-nodes operating to respond to a query, in accordance with an embodiment of the disclosure.

FIG. 5 schematically illustrates NG-nodes 50 shown in FIG. 1B operating to access Tiered Index Store 40 to respond to a query, schematically represented by a block arrow 80 with regards to operation of communications network 20 submitted by a user to a server 180. By way of example, query 80 comprises a query for GTP-C packets for a selection of IMSIs in a time interval bounded by times $t_a$ and $t_b$ where $t_a < t_b$ that are characterized by a value in a given range of values for a particular at least one intrinsic Base-index and/or a particular at least one elective Base-index. Server 180 submits the query in a communication represented by an arrow 81 to an NG-node 50 individualized by a label 50/m.

In accordance with an embodiment of the disclosure NG-node 50/m is configured as a manager node that operates to manage operation of other NG-nodes 50 to carry out data processing tasks associated with operations of communications network 20. By way of example, manager node 50/m selects a set of NG-nodes 50 individualized by labels 50/1, 50/2, and 50/3 to perform as worker NG-nodes in accordance with instructions received from manager node 50/m to cooperate in generating a response to query 80 received from server 180. Manager node NG-node 50/m optionally transmits a communication, schematically represented by an arrow 82, to NG-node 50/1 instructing the NG-node to query stateful ID-data store 44 for stateful ID records having a start time $t_S$ and/or an end time $t_E$ between times $t_a < t_b$, and an IMSI in the selection of IMSIs comprised in query 80. In response to the instructions, NG-node 50/1 communicates, as schematically indicated by an arrow 83, with ID-data store 44 to execute the desired query and retrieves, as schematically indicated by an arrow 84, the desired stateful ID-records. NG node 50/1 forwards, as indicated by an arrow 85, the retrieved stateful ID-index records to manager NG-node 50/m. The stateful ID-index records provide manager NG-node 50/m with GTPC-TEID-A and GTPC-TEID-B values associated with the selection of IMSIs and time range $t_a$-$t_b$.

In a communication indicted by an arrow 86 with worker NG-node 50/2, manager NG-node 50/m transmits to the worker node a first portion of the GTPC-TEID-A and GTPC-TEID-B values that the manager node received from worker NG-node 50/1. Manager node 50/m instructs worker NG-node 50/2 to query shared stateless Base-index store 42 to retrieve and forward to the manager NG-node stateless Base-index records that comprise a GTPC-TEID-A and/or a GTPC-TEID-B value in the first portion. In addition, if query 80 stipulated a constraint on a particular at least one elective Base-index, NG-node 50/1 may extract from raw packet data in the retrieved records, values for the at least one elective Base-index and add the values to Base-index vectors that the retrieved Base index records respectively comprise. The query that NG-node 50/2 executes to retrieve the desired stateless Base-index records is schematically indicated by an arrow 87 and retrieval of the desired records by an arrow 88. An arrow 89 schematically indicates a communication in which NG-node 50/2 forwards the retrieved desired Base-index records to manager NG-node 50/m.

Similarly, in a communication indicted by an arrow 906 with worker NG-node 50/3, manager NG-node 50/m transmits to the worker node a second portion of the GTPC-TEID-A and GTPC-TEID-B values that the manager node received from worker NG-node 50/1. The manager node instructs worker NG-node 50/3 to query shared stateless Base-index store 42 to retrieve and forward to the manager NG-node stateless Base-index records that comprise a GTPC-TEID-A and/or a GTPC-TEID-B value in the second portion. In addition, if query 80 stipulated a constraint on a particular at least one elective Base-index, NG-node 50/3 may extract from raw packet data in the retrieved records values for the at least one elective Base-index and add the values to Base-index vectors that the retrieved Base index records respectively comprise. The query that NG-node 50/2 executes to retrieve the desired stateless Base-index records is schematically indicated by an arrow 91 and retrieval of the desired records by an arrow 92. An arrow 93 schematically indicates a communication in which NG-node 50/3 forwards the retrieved desired Base-index records to manager NG-node 50/m.

Manager node 50/m aggregates the Base-index records received from worker NG-nodes 50/2 and 50/3 and in a communication schematically indicated by an arrow 94 forwards the aggregated records to server 180. Server 180 provides a response, schematically indicated by a block arrow 95, comprising the aggregated records to the user that submitted query 80 to the server.

Figure 6A:
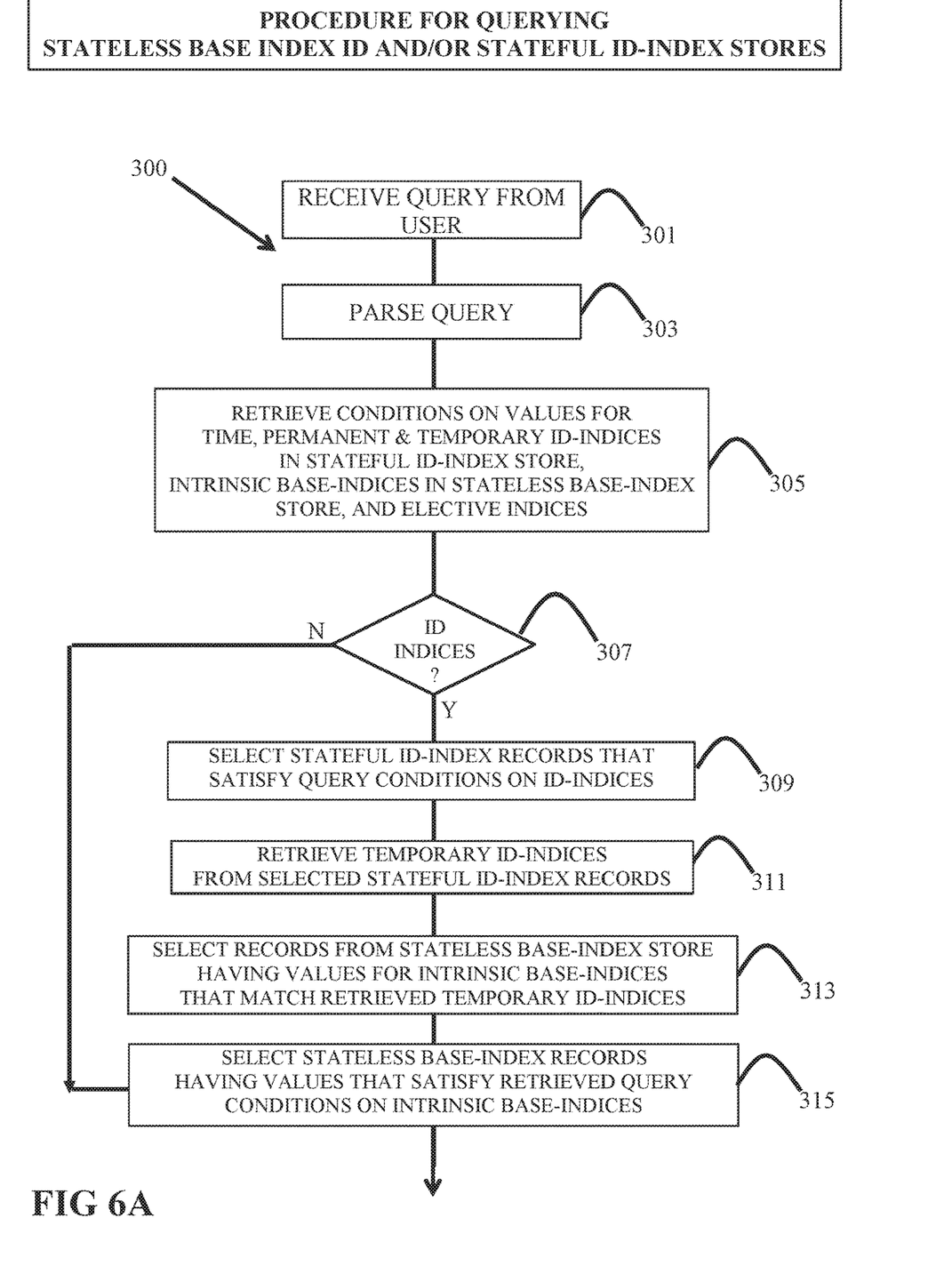
FIG. 6A and FIG. 6B show a flow diagram of a procedure by which the NG-nodes in a hierarchical configuration similar to that shown in FIG. 5 operate to respond to a query, in accordance with an embodiment of the disclosure.
Figure 6B:
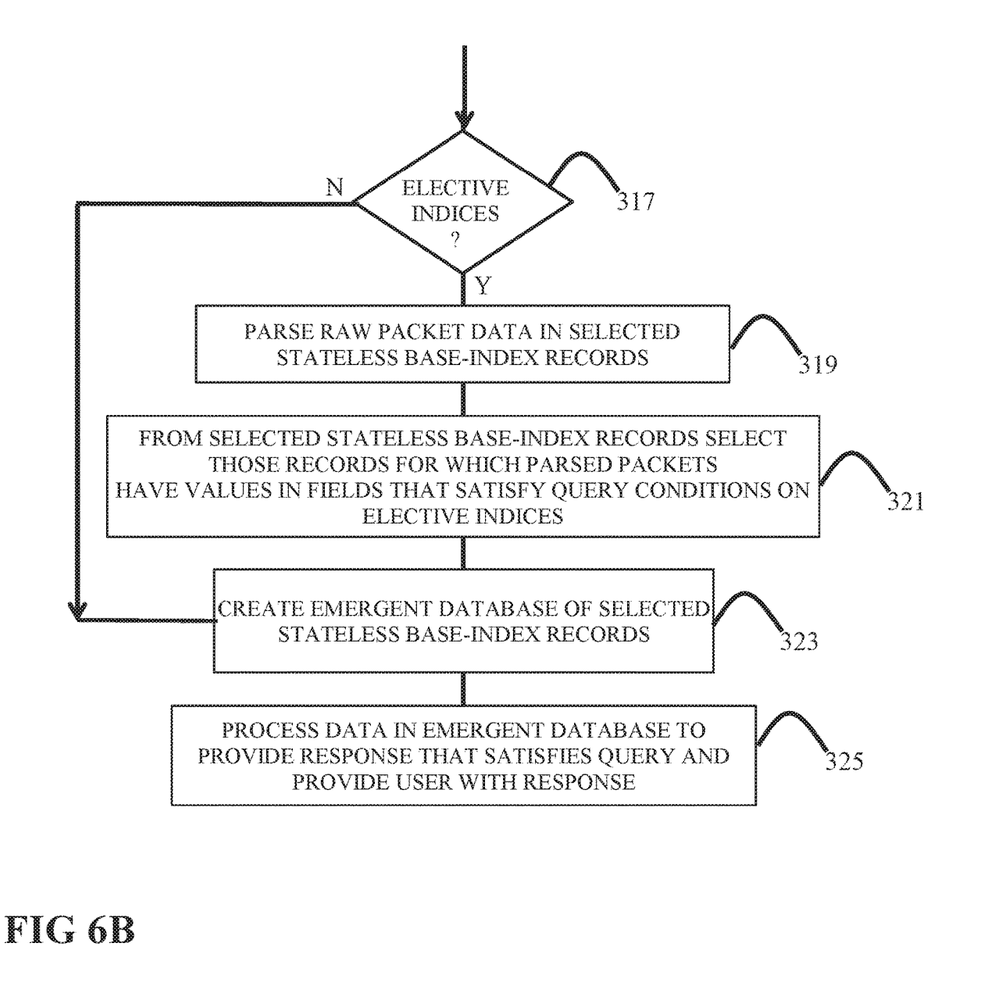

FIGS. 6A and 6B show a flow diagram of a procedure 300 by which a NG-node 50, or selection of NG-nodes 50 operating in accordance with instructions received from a manager NG-node 50, may query Tiered Index Store 40 (FIG. 1B, 1C, 5) in accordance with an embodiment of the disclosure.

In a block 301 NG-node 50 or selection of NG-nodes 50, hereinafter referred to as an NG-node for convenience of presentation, receives a query from a user. In a block 303 the NG-node parses the query and optionally in a block 305 retrieves from the query conditions that the query may have on values for time, permanent and temporary ID-indices in stateful ID-index store 44, intrinsic Base-indices in stateless base-index store 42, and/or elective Base-indices. Optionally, in a decision block 307 the NG node determines whether the query comprises at least one condition on the ID-indices in stateful ID-index records stored in stateful ID-index store 44. If yes, the NG-node optionally proceeds to a block 309. In block 309 the NG-node selects stateful ID-index records from stateful ID index store 44 that satisfy the at least one condition on the ID-indices and retrieves temporary ID-indices from the selected stateful ID-index records. In a block 313 the NG-node selects stateless records from stateless Base-index store 42 having values for intrinsic Base-indices that match the retrieved temporary ID-indices and optionally proceeds to a block 315. If on the other hand the NG-node determines in decision block 307 that the query does not comprise at least one condition on the ID-indices the NG-node optionally skips blocks 309-313 and proceeds directly to block 315. In block 315 the NG-node selects from those stateless Base-index records selected in block 313 stateless Base-index records having values that satisfy conditions on intrinsic Base-indices retrieved from the query.

Optionally, in a decision block 317 the NG-node determines whether or not the query comprises at least one condition based on an elective Base-index. If yes, optionally in a block 319 the NG-node parses raw packet data from packets associated with Base-index records selected in block 315. In a block 321 the NG-node selects those packets for which the parsed raw data has values in fields that satisfy the at least one query condition based on an elective index and optionally proceeds to a block 323. If on the other hand the NG-node determines in decision block 317 that the query does not comprise at least one condition based on an elective Base-index, the NG-node skips block 319 and 321 and optionally proceeds directly to a block 323.

In block 323 the NG-node creates an emergent database comprising the stateless Base-index records selected in block 315 or block 321. Optionally in a block 325 the NG-node processes data in the emergent database to provide a response that satisfies the query and provides the user with response.

There is therefore provided in accordance with an embodiment of the disclosure a data store configured to store data generated by activity of network elements (NEs) of a communications network, the data store comprising: a stateless Base-index data store configured to store stateless Base-index records, each stateless Base-index record comprising a copy of at least a portion of data comprised in a protocol data unit (PDU) generated by an NE and a stateless Base-index vector comprising a value for at least one intrinsic Base-index from a selection of intrinsic Base indices, which value may be used to associate the PDU with a temporary feature of the network; and a stateful identifier index (ID-index) store configured to store stateful ID-index records, each stateful ID-index stateful record comprising an identifier index (ID-index) vector comprising: a value for at least one permanent ID-index of a selection of permanent ID-indices, which value uniquely identifies a source entity of network activity as long as the source entity is associated with the communications network and a value for at least one temporary ID-index of a selection of temporary ID-indices which value identifies a temporary feature of the network associated with the value for the permanent ID-index; and/or a value for at least one current temporary ID-index and at least one expired temporary ID-index that are associated with a same permanent ID-index; a time period for which the association between the at least one value for the temporary ID-index value and the at least one value for the permanent ID-index value and/or the association between the current and expired temporary ID-index is valid; wherein the selection of intrinsic Base-indices and the selection of temporary ID-indices share at least one common index. Optionally, for the time period the stateful ID-index store is configured to store only one record comprising a same ID-index vector. Additionally, or alternatively, an intrinsic Base-index in the selection of Base-indices is a temporary ID-index in the selection of ID-indices.

In an embodiment, the selection of permanent ID-indices comprises at least one or any combination of more than one of an IMSI (International Mobile Subscriber Identity) and SUPIs (Subscription Permanent Identifier), IMEI (International Mobile Equipment Identifier), or MSISDN (Mobile Station International Subscriber Directory Number).

In an embodiment, the selection of temporary ID-indices comprises at least one or any combination of more than one of a GUTI, S1AP.CELL IDENTITY, GTPv2-TEID Key UL, GTPv2-TEID Key DL, GTPv2-F-TEID IP UL, or GTPv2-F-TEID IP DL.

In an embodiment, the selection of intrinsic Base-indices comprises at least one or any combination of more than one of a GUTI, eNB-E-S1AP-ID, MME-UE-S1AP-ID, GTP-C-TEID-A, GTP-C-TEID-B, GTP-C msg-type, GTP-C Seq num and Diameter H2H-ID.

There is further provided in accordance with an embodiment of the disclosure a new generation node (NG-node) configured to monitor operation of an NE, the NG-node comprising: a source configurable to acquire PDUs generated by a NE in accordance with a protocol selected from a plurality of different protocols; a preprocessor operable to receive a PDU acquired by the source and format data in PDUs to conform the data to a common format; a processor configured to receive the data formatted in the common format and process the data to: extract data from fields in the PDU; use the extracted data to compose a stateless Base-index record in accordance with in accordance with an embodiment of the disclosure; and a sink configured to receive and forward the stateless Base-index record for storage in the stateless Base-index store. Optionally, the processor is configured to use the extracted data to compose a stateful ID-index record. Optionally, the sink is configured to receive and forward the composed stateful ID-index record for storage in the stateful ID-index store.

In an embodiment the NG-node is configured to: determine whether the stateful ID-index store comprises a copy of the composed stateful ID-index record; and forward the ID-index record for storage in in the stateful ID-index store if and only if the stateful ID-index is determined not to comprise a copy of the composed stateful ID-index record.

There is further provided in accordance with an embodiment of the disclosure a system for monitoring a communications network, the system comprising: a data store according to an embodiment of the disclosure; and at least one NG-node configured to acquire PDUs from a NE in the communications network and process the PDU to compose a stateless Base-index record responsive to data in the PDU and forward the Base-index record for storage in the stateless Base-index store of the data store.

Optionally, the at least one NG-node is configured to compose a stateful ID-index record responsive to data in the PDU and forward the composed stateful ID-index record for storage in the stateful ID-index store in the data store. Additionally, or alternatively, the at least one NG-node may comprise a plurality of NG-nodes each configured to acquire PDUs from a different NE in the network. Optionally, the plurality of NG-nodes comprises a hierarchical configuration of NG-node comprising least one NG-node configured to operate as a manager node that controls operations at least one other node of the plurality of nodes to cooperate in processing data generated by activity of the communications network.

In an embodiment the at least one NG-node is configured to respond to a query for data related to activity of the communications network by: querying the stateful ID-index store for a value for at least one temporary ID-index related to the query; using the value to select stateless records in the stateless Base-index store having data required by the query; and responding to the query by providing at least a portion of the data comprised in the selected stateless Base-index records. Optionally, the at least one NG-node is configured to process copies of raw data comprised in PDUs that are comprised in the selected Base-index records to generate a value for an elective Base-index that the query may require and include the value in responding to the query. Optionally, the at least one NG-node is configured to process the value for the elective Base-index to provide data that satisfies a constraint defined in the query. Optionally, the at least one NG-node is configured to include the data in responding to the query.

In an embodiment, the communications network comprises at least one or any combination of more than one of a 3G (3rd generation), 4G (4-th Generation) and/or 5G (5-th Generation) network.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A data store for a communications network configured to store data generated by activity of network elements (NEs) of the communications network, the data store-comprising:
    a stateless Base-index data store configured to store stateless Base-index records, each stateless Base-index record comprising a copy of at least a portion of data comprised in a protocol data unit (PDU) generated by an NE and a stateless Base-index vector comprising a value for at least one intrinsic Base-index from a selection of intrinsic Base indices, which value may be used to associate the PDU with a temporary feature of the network; and
    a stateful identifier index (ID-index) store configured to store stateful ID-index records, each stateful ID-index record comprising an identifier index (ID-index) vector comprising:
        a value for at least one permanent ID-index of a selection of permanent ID-indices, which value uniquely identifies a source entity of network activity as long as the source entity is associated with the communications network, and a value for at least one temporary ID-index of a selection of temporary ID-indices which value for the at least one temporary ID-index identifies a temporary feature of the network associated with the value for the permanent ID-index; and/or
        a value for at least one current temporary ID-index and at least one expired temporary ID-index that are associated with a same permanent ID-index;
        a time period for which the association between the at least one value for the temporary ID-index value and the at least one value for the permanent ID-index value and/or the association between the current and expired temporary ID-index is valid;
    wherein the selection of intrinsic Base-indices and the selection of temporary ID-indices share at least one common index.

2. The data store according to claim 1 wherein for the time period the stateful ID-index store is configured to store only one record comprising a same ID-index vector.

3. The data store according to claim 1 wherein an intrinsic Base-index in the selection of Base-indices is a temporary ID-index in the selection of ID-indices.

4. The data store according to claim 1 wherein the selection of permanent ID-indices comprises at least one or any combination of more than one of an IMSI (International Mobile Subscriber Identity) and SUPIs (Subscription Permanent Identifier), IMEI (International Mobile Equipment Identifier), or MSISDN (Mobile Station International Subscriber Directory Number).

5. The data store according to claim 1 wherein the selection of temporary ID-indices comprises at least one or any combination of more than one of a GUTI (globally unique temporary identity), S1AP.CELL IDENTITY (S1 application protocol cell identity), GTPv2-TEID Key UL (general packet radio services tunnelling protocol version 2-tunnel end identifier key up link), GTPv2-TEID Key DL (down link), GTPv2-F-TEID IP UL (internet protocol up link), or GTPv2-F-TEID IP DL (internet protocol down link).

6. The data store according to claim 1 wherein the selection of intrinsic Base-indices comprises at least one or any combination of more than one of a GUTI (globally unique temporary identity), eNB-E-S1AP-ID (evolved node B equipment S1 application protocol identifier), MME-UE-S1AP-ID (mobile management entity user equipment S1 application protocol identifier), GTP-C-TEID-A (general packet radio services tunnelling protocol C tunnel end identifier A), GTP-C-TEID-B (general packet radio services tunnelling protocol C tunnel end identifier B), GTP-C msg-type (general packet radio services tunnelling protocol C message type), GTP-C Seq num (general packet radio services tunnelling protocol C sequence number) and Diameter H2H-ID (Diameter host to host identifier Or hop by hop identifier).

7. A new generation node configured to monitor operation of an NE, the NG-node comprising:
a source configurable to acquire PDUs (protocol data unit) generated by a NE in accordance with a protocol selected from a plurality of different protocols;
a preprocessor operable to receive a PDU acquired by the source and format data in PDUs to conform the data to a common format;
a processor configured to receive the data formatted in the common format and process the data to:
extract data from fields in the PDU;
use the extracted data to compose a stateless Base-index record in accordance with claim 1; and
a sink configured to receive and forward the stateless Base-index record for storage in the stateless Base-index store.

8. The NG-node according to claim 7 wherein the processor is configured to use the extracted data to compose a stateful ID-index record.

9. The NG-node according to claim 8 wherein the sink is configured to receive and forward the composed stateful ID-index record for storage in the stateful ID-index store.

10. The NG-node according to claim 9 and configured to:
determine whether the stateful ID-index store comprises a copy of the composed stateful ID-index record; and
forward the ID-index record for storage in in the stateful ID-index store if and only if the stateful ID-index is determined not to comprise a copy of the composed stateful ID-index record.

11. A system for monitoring a communications network, the system comprising:
the data store according to claim 1; and
at least one NG-node (new generation node) configured to acquire PDUs from a NE in the communications network and process the PDU to compose a stateless Base-index record responsive to data in the PDU and forward the Base-index record for storage in the stateless Base-index store of the data store.

12. The system according to claim 11 wherein the at least one NG-node is configured to compose a stateful ID-index (identifier index) record responsive to data in the PDU and forward the composed stateful ID-index record for storage in the stateful ID-index store in the data store.

13. The system according to claim 11, wherein the at least one NG-node comprises a plurality of NG-nodes each configured to acquire PDUs from a different NE in the network.

14. The system according to claim 13 wherein the plurality of NG-nodes comprises a hierarchical configuration of NG-node comprising least one NG-node configured to operate as a manager node that controls operations at least one other node of the plurality of nodes to cooperate in processing data generated by activity of the communications network.

15. The system according to claim 11, wherein the at least one NG-node is configured to respond to a query for data related to activity of the communications network by:
querying the stateful ID-index store for a value for at least one temporary ID-index related to the query;
using the value to select stateless records in the stateless Base-index store having data required by the query; and
responding to the query by providing at least a portion of the data comprised in the selected stateless Base-index records.

16. The system according to claim 15 wherein the at least one NG-node is configured to process copies of raw data comprised in PDUs that are comprised in the selected Base-index records to generate a value for an elective Base-index that the query may require and include the value in responding to the query.

17. The system according to claim 16 wherein the at least one NG-node is configured to process the value for the elective Base-index to provide data that satisfies a constraint defined in the query.

18. The system according to claim 17 wherein the at least one NG-node is configured to include the data in responding to the query.

19. The system according to claim 11 wherein the communications network comprises at least one or any combination of more than one of a 3G (3rd generation), 4G (4-th Generation) and/or 5G (5-th Generation) network.

* * * * *